United States Patent [19]

Hemsworth et al.

[11] 4,087,199

[45] May 2, 1978

[54] CERAMIC TURBINE SHROUD ASSEMBLY

[75] Inventors: Martin C. Hemsworth; Robert J. Corsmeier, both of Cincinnati; Ambrose A. Hauser, Wyoming, all of Ohio

[73] Assignee: General Electric Company, Cincinnati, Ohio

[21] Appl. No.: 743,616

[22] Filed: Nov. 22, 1976

[51] Int. Cl.² ............................................. F01D 11/08
[52] U.S. Cl. ..................................... 415/174; 415/197
[58] Field of Search .................. 415/174, 170 R, 197, 415/196, 200, 178, 177, 214; 403/373, 374, 381; 277/35

[56] References Cited

U.S. PATENT DOCUMENTS

| 3,398,931 | 8/1968 | Miller | 415/214 X |
| 3,601,414 | 8/1971 | Rao | 415/214 X |
| 3,864,056 | 2/1975 | Gabriel et al. | 415/178 |

*Primary Examiner*—Carlton R. Croyle
*Assistant Examiner*—Donald S. Holland

*Attorney, Agent, or Firm*—Robert C. Lampe, Jr.; Derek P. Lawrence

[57] ABSTRACT

A high temperature turbine shroud assembly for an aircraft gas turbine engine comprising a plurality of arcuate ceramic blocks arranged in a ring. The blocks are supported by a pair of annular support members which retain the blocks in the assembly. Spring-like fingers associated with the support members apply a preloaded force against a pair of slanted dovetail surfaces on the blocks to force the blocks against rigid stops formed upon the annular support members, thereby establishing their proper radial position within the assembly. The preload applied by the fingers accommodates the thermal expansion differences between the ceramic blocks and the metallic support members. In an alternative embodiment, the blocks are retained between cooperating rigid legs extending from the annular support members and wedged radially inwardly into position by a preloaded spring contacting the back side of the blocks. Heat transfer between the blocks and metallic support members is minimized by providing point or line contact between components, thus reducing the contact area available for heat conduction.

12 Claims, 6 Drawing Figures

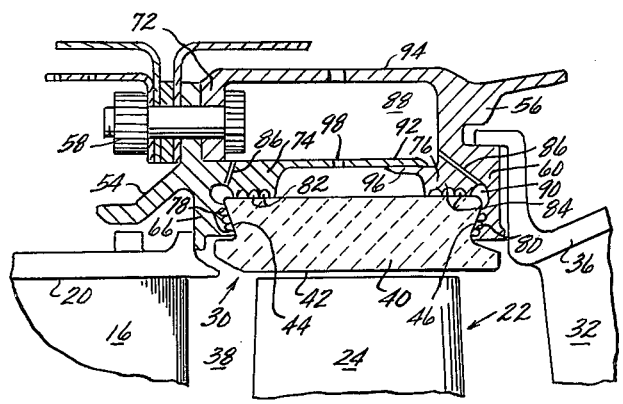
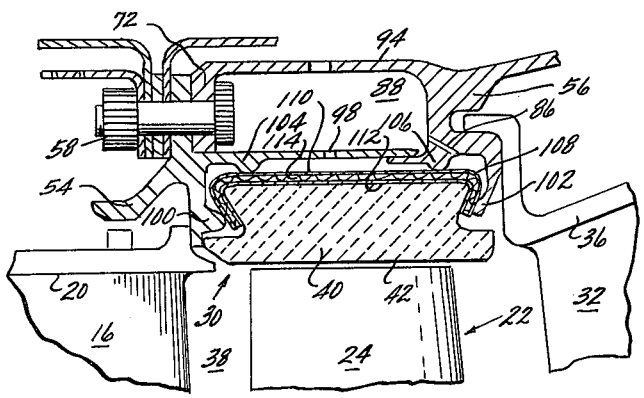
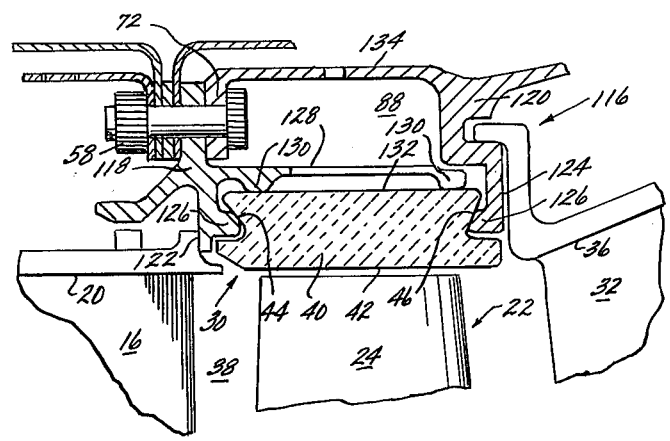

CERAMIC TURBINE SHROUD ASSEMBLY

The invention herein described was made in the course of or under a contract, or a subcontract thereunder, with the United States Department of the Air Force.

BACKGROUND OF THE INVENTION

The present invention relates to gas turbine engines and, more particularly, to high temperature turbine shrouds.

Heat generated in gas turbine engines presents a challenge to gas turbine engine structural designers. This problem is particularly challenging in the turbine portion of the engine where temperatures generated by the upstream combustor are most severe. For example, turbine flow path defining members are subjected to the products of combustion, and as combustor temperatures increase to levels well in excess of 2000° F, it becomes increasingly difficult to provide a structure which can withstand such an environment. The problem is further compounded in gas turbine engines for aircraft application where light weight is an essential design consideration.

Basically, two approaches have been taken to at least partially alleviate the problem. On the one hand, various methods of fluid cooling of the turbine structure have been employed. Such methods are commonly referred to as convection, impingement and film cooling. These methods are well known in the art as discussed in U.S. Pat. No. 3,800,864 — Hauser et al, which is assigned to the assignee of the present invention. All of these methods tend to reduce peak metal temperatures and temperature gradients through the use of a cooling fluid (typically air), thereby making the use of higher turbine inlet temperatures possible. However, as the combustion temperatures increase, the amount of cooling air necessary to maintain acceptable metal temperatures also increases. Since cooling air is air which could otherwise be effectively used in the propulsion cycle, and since the extraction of the air for cooling purposes effectively penalizes the overall engine performance and efficiency, it is desirable to keep the coolant flow at as low a level as possible.

The second approach toward obtaining a high turbine operating temperature is to provide a material which can withstand the high temperatures with little or no fluid cooling. One type of material which can endure such temperatures is ceramics. Modern, hot pressed ceramics such as silicone carbide and silicone nitride possess very high strength at elevated temperatures. It is now contemplated that this high temperature strength can be utilized to design gas turbine components requiring little or no cooling air to properly function at allowable levels of thermal stress, thereby enhancing overall turbine efficiency and performance. The low costs and light weight associated with ceramics offer additional advantages in aircraft gas turbine engine applications.

Certain characteristics of ceramic materials must be addressed, however, prior to executing a successful design in ceramics. In particular, it must be recognized that ceramics are brittle materials, having little or no ductility and low impact tolerance. Furthermore, the thermal expansion coefficients of ceramic materials are only about 10 to 20 percent of conventional nickel alloy materials, thereby presenting interface problems compounded by the ceramic material's relatively low level of tensile strength.

SUMMARY OF THE INVENTION

An object of the present invention, therefore, is to provide a new and improved turbine shroud assembly for disposition over the tips of a rotating turbine blade row which incorporates ceramic materials to withstand high temperatures of combustion.

A further object of the present invention is to provide a turbine shroud assembly which can accommodate the different thermal expansion coefficients of ceramic and metallic constituents.

These and other objects and advantages will be more clearly understood from the following detailed description, the drawings and specific examples, all of which are intended to be typical of rather than in any way limiting to the scope of the present invention.

Briefly stated, the above objectives are accomplished in a turbine shroud assembly which forms a ring-like stationary shroud over the tips of a rotating turbine blade row. A plurality of ceramic blocks of generally rectangular plan form are arranged in a ring, the inner surfaces of the blocks being of arcuate profile to partially define the turbine hot gas flow path. Each block is provided with a pair of dovetail surfaces formed on opposite sides of the block which function as wedging surfaces. In one embodiment, metallic clamping means in the form of a pair of annular spring-like members hold the blocks in the assembly and produce a preloaded radial force against the dovetail surfaces. This preload urges the blocks in the radial direction against rigid stops which establish their proper radial position in the assembly. The preloaded clamping of the blocks retains the blocks without the need for bolts or tongue-and-groove attachments and assures retention while still accommodating the smaller thermal growth of the blocks relative to the metallic structure due to the lower thermal expansion coefficient of the ceramic materials. Various thermal barriers are provided to minimize heat transfer between the ceramic shroud and metallic support members. Alternative embodiments of the novel concept are also depicted and claimed.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example, with the accompanying drawings in which:

FIG. 4 is an enlarged portion of the tubrine shroud assembly of FIG. 1 depicting the means for retaining the ceramic shroud blocks in greater detail;

FIG. 5 is an alternative embodiment of the turbine shroud assembly of FIG. 1; and FIG. 6 is yet another alternative embodiment of the turbine shroud assembly of FIG. 1.

DESCRIPTION OF THE PREFERRED EMBODIMENT

Figure 1:
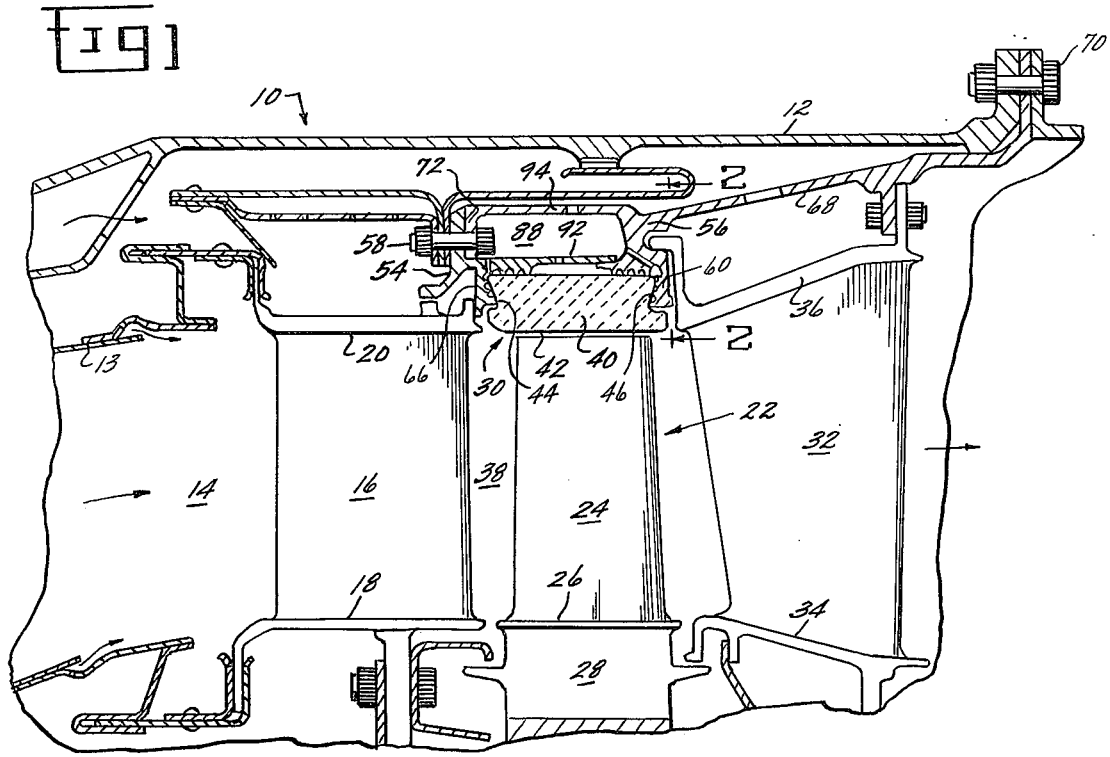
FIG. 1 is a view in cross section of a portion of a gas turbine engine incorporating the turbine shroud assembly of the present invention.

Referring to the drawings wherein like numerals correspond to like elements throughout, attention is first directed to FIG. 1 which discloses a cross-sectional view of a portion of a gas turbine engine, generally designated 10, including a structural support frame 12. The engine includes a combustion chamber 13 in the region of 14, followed immediately downstream by a annular row of stationary turbine inlet nozzle vanes 16 (only one of which is depicted for clarity) carried by inner and outer nozzle bands 18 and 20, respectively. Downstream of nozzle vanes 16 is disposed a first annular row of turbine buckets 22 (again, only one of which is depicted), each having an airfoil portion 24 and a laterally extending platform 26, carried about the periphery of a rotatable turbine wheel 28. Encircling the buckets 26 is a shroud assembly 30, the subject of the present invention and soon to be described in more particularity. A second annular row of stationary turbine vanes 32 (only one of which is shown) is disposed downstream of the turbine buckets 22 and is carried between inner and outer flow path defining bands 34, 36, respectively. An annular hot gas passage 38 is thus defined between bands 18, 34 and platform 26 on the inner side, and by bands 20, 36 and shroud assembly 30 on the outer side. It may be appreciated that each of these members bounding and partially defining hot gas passage 38 is subjected to the intense heat associated with the products of combustion exiting combustor 13. It is toward the construction of a turbine shroud capable of withstanding such an environment that the present invention is particularly directed.

Figure 2:
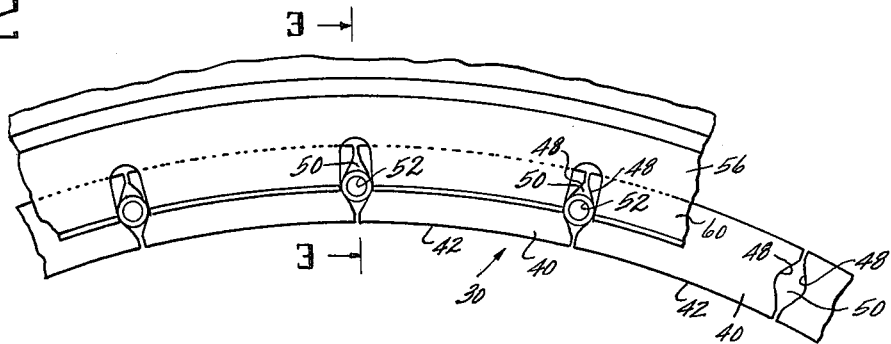
FIG. 2 is a view in partial cross section taken along line 2 — 2 of FIG. 1.

One embodiment of such a turbine shroud assembly which incorporates ceramic material in order to withstand high temperature is shown in FIGS. 1 throuh 4. Therein, turbine shroud assembly 30 is shown to include a plurality of ceramic blocks 40 of generally rectangular plan form arranged in a ring, each block being provided with an arcuate inner surface 42 partially defining the hot gas passage. Modern, hot pressed ceramics such as silicone carbide and silicone nitride are suitable representative materials. Each block is designed to be thick (in the radial direction) to address the problem of full impact tolerance of ceramics, the major sources of impact damage being debris entrained in the hot gas stream and rubbing of the tips of the buckets 22 against the shroud during transient operation of the turbine. The thickness and volume of each block should be as great as possible, giving due consideration to thermal stress gradients, weight, available space and the implications of the Weibull parameter which, as is well known, is related to the probability of occurrence of a flaw in the ceramic material. The upstream and downstream edges of each block are contoured to form a pair of dovetail surfaces 44 and 46, respectively, disposed in an acute angle to the inner arcuate surface 42. The remaining lateral edges of each block are each provided with a semicircular groove 48, the mutually facing grooves of circumferentially adjacent blocks cooperating to form axially extending cavities 50 (see FIGS. 2 and 3). Tubular metallic or ceramic seals 52 installed within the cavities 50 prevent leakage between blocks in the generally radial direction.

Turbine shroud assembly 30 also provides support for the blocks through a pair of axially spaced annular members 54, 56 connected together by a ring of bolts 58 to form a structure of substantially U-shaped cross section. The downstream support member 56 includes a plurality of radially inwardly extending flexible fingers 60, one or more fingers being associated with each ceramic block and gripping dovetail surface 46 thereof (see FIGS. 2 and 4). Inwardly extending, ring-like annular prolongation 66 associated with member 54 is relatively more rigid than fingers 60 and grips dovetail surface 44. Annular member 56, in turn, is connected to the structural support frame 12 through generally conical arm 68 and bolted connection 70, while annular member 54 is connected to flange 72 which is integral with conical arm 68.

The distance between fingers 60 and annular prolongation 66 of member 54 is so sized as to be slightly less than the axial distance between the dovetail surfaces at their point of engagement in the static cold condition. Thus, during assembly, as bolts 58 are drawn tight, the segmented fingers 60 will deflect slightly as they grip the blocks along the dovetail surfaces. This preload is required to clamp and retain the blocks without resorting to the need for bolting the blocks directly to the support structure or connecting them thereto by means of tongue-and-groove attachments. The dovetail surfaces provide a low stress concentration means of attachment as compared to the bolted or tongue-and-groove means of attachment. Additionally, the preloaded fingers accommodate the smaller thermal growth of the blocks relative to the metallic annular members 54, 56 resulting from the lower thermal expansion coefficient of ceramic materials compared to metals. Since each block has its own gripping finger or fingers associated therewith, a tight grip on each block is assured although each block is not exactly the same size due to permissible manufacturing tolerances and differences in operating temperature as a result of circumferential gas temperature variations.

Since the preloaded spring-like fingers 60 act upon angled dovetail surfaces, they also produce a force component upon the blocks tending to force the blocks radially outwardly. Accordingly, annular support members 54 and 56 are provided with stop means in the form of mutually facing, axially extending shoulders 74 and 76, respectively (see FIG. 4), upon which the blocks are wedged by the fingers and the angled dovetail surfaces, and which establish the proper radial position of the blocks within the assembly. Thus, the fingers 60 and annular prolongation 66 of member 54 clamp the blocks axially for retention within the assembly and, in combination with shoulders 74 and 76, assure proper radial orientation of the blocks.

Figure 3:
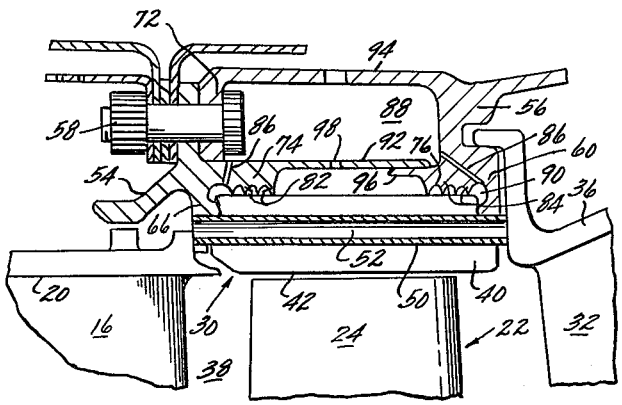
FIG. 3 is a view in partial cross section taken along line 3 — 3 of FIG. 2 depicting the installation of seals between adjacent shroud blocks.

Due to the extremely high temperature level which may be encountered along hot gas passage 38, means are provided to form a thermal barrier to prevent large heat flows from the ceramic blocks into the metallic support structure. In particular, a plurality of teeth 78, 80, 82, and 84, machined into fingers 60, annular prolongation 66 and shoulders 74, 76 (the only metallic structure in contact with the ceramic blocks) reduce the contact area through which heat can flow. While not shown, in some applications it may be desirable to provide circumferentially spaced axial slots in the teeth so as to permit the circulation of air between the blocks 40 and members 54, 56, thereby reducing the temperature along the back side of the blocks, as well as reducing the temperature of the support. Additionally, a plurality of holes 86 could be provided to permit air to circulate form plenum 88 behind the blocks into cavity 90 as shown in FIG. 3. This small amount of cooling air is sufficient to cool fingers 60 and prevent them from permanently deforming. In such event, plenum 88 could be in fluid communication with a coolant fluid (such as compressor bleed air) in a manner well known in the art.

An annular heat shield 92 comprising an axial extension of shoulder 74 reduces heat transfer by radiation and conduction between the ceramic blocks and that portion 94 of the annular member 56 which comprises the base of the U-shaped clamping structure. Heat shield 92 is supported at its downstream end by a lip 96 protruding from the shoulder portion 76 of annular member 56. Hole 98 permits cooling air from plenum 88 to purge and cool the backside of blocks 40.

FIG. 5 discloses another embodiment of the subject invention incorporating alternative schemes for reducing the heat flow from the ceramic blocks to the metallic support structure. Therein, cylindrical surfaces 100, 102, 104 and 106 replace seal teeth 78, 80, 82 and 84, respectively, and permit only line contact between the metallic and ceramic elements. This somewhat simplified approach eliminates the necessity of the more costly machining operation associated with the seal teeth. To further prevent heat transfer, a metallic heat shield 108, contoured to the dovetail shape of ceramic blocks 40, is placed between the blocks and the metallic annular members 54, 56. This shield is preferably of a laminated construction comprising two facing sheets 110, 112 separated by a honeycomb or corrugated core 114 so as to permit the free circulation of cooling air therebetween. Such a shield reduces heat transfer by both conduction and radiation from the block to the metallic structural members. While FIG. 1 depicts an embodiment exclusively utilizing teeth to reduce heat transfer, and FIG. 5 depicts the use of cylindrical surfaces for such a purpose, it is clear that the choice of one or the other methods is not necessarily exclusive, and that some of the contact surfaces may be of one variety and some of the other. The choice will generally be dictated by manufacturing and fabrication considerations.

Attention is now directed to FIG. 6 wherein an alternative embodiment of the present invention is depicted in cross section. Therein, the method of retaining blocks 40 is slightly different than that of FIG. 1 in that instead of the blocks being wedged radially outwardly along dovetail surfaces 44, 46, they are now wedged radially inwardly. In particular, a slightly modified turbine assembly 116 comprises a pair of annular members 118, 120 connected together, and to a frame, much in the manner of the embodiment of FIG. 1. However, instead of spring-like fingers, members 118, 120 are provided with relatively rigid inwardly extending annular legs 122, 124, respectively, forming a groove therebetween for receiving blocks 40. Protruding from the legs are a pair of cylindrical surfaces 126 for slidingly engaging blocks 40 when inserted within the groove.

A segmented annular spring 128 extends axially from member 118 and includes a pair of cylindrical protuberances 130 on the radially inward side thereof which are so sized as to contact the back surface 132 of blocks 40. Spring 128 is preloaded such that in the cold static condition, blocks 40 are forced radially inwardly, with dovetail surfaces 44, 46 wedging against the cylindrical surfaces 126 of members 122, 124. Again, the preload is required to assure block retention while accommodating the smaller thermal growth experienced by the blocks relative to annular support members 118, 120. In essence, surfaces 126 function as stops for establishing the proper radial position of blocks 40 within the assembly, as well as serving as the means for retaining the blocks within the assembly. It is clear that teeth as taught in FIG. 1 could be provided instead of cylindrical surfaces 126, 130 for minimizing thermal conduction. Note also that spring 128 serves a dual function, providing a preloaded force upon the blocks to retain them in the assembly and also providing a heat shield to reduce heat transfer by radiation between the blocks and base portions 134 of member 120.

It should become obvious to one skilled in the art that certain changes can be made to the above-described invention without departing from the broad inventive concepts thereof. For example, the concept taught herein may be applied to many bladed structures and is not necessarily limited in application to the turbine portions of gas turbine engines. Furthermore, the concepts are applicable at interfaces where it is desired to retain ceramics within a basically metallic structure and where large changes in temperature are expected. It is intended that the appended claims cover these and all other variations in the present invention's broad inventive concepts.

Having thus described the invention, what is considered novel and desired to be secured by Letters Patent of the United States is:

1. A turbine shroud assembly comprising
   a ceramic block having an inner surface partially defining a generally annular hot gas passage and a pair of inclined dovetail surfaces disposed on opposite edges of the block;
   rigid stop means upon which said ceramic block is seated;
   a first annular support member bearing against a dovetail surface; and
   a second annular support member having a flexible finger bearing against the opposite dovetail surface, said flexible finger applying a radially directed force component for urging said block into engagement with said stop means.

2. The assembly as recited in claim 1 comprising a plurality of ceramic blocks arranged in a ring, each block having an arcuate inner surface partially defining the hot gas passage and a pair of dovetail surfaces disposed on opposed edges at an acute angle to the inner surface.

3. The assembly as recited in claim 2 wherein said stop means comprises a shoulder extending axially from one of said annular support members and disposed radially outwardly of said blocks.

4. The assembly as recited in claim 2 further comprising thermal barrier means between said annular support members and said ceramic blocks to minimize heat transfer therebetween.

5. The assembly as recited in claim 4 wherein said thermal barrier means comprises a substantially annular heat shield generally circumscribing said ceramic blocks, said heat shield comprising an axial extension of one of said annular support members.

6. The assembly as recited in claim 4 wherein said thermal barrier means includes a plurality of teeth formed upon said fingers contacting said ceramic blocks.

7. The assembly as recited in claim 4 wherein said thermal barrier means includes a cylindrical surface formed upon said fingers to provide line contact between said cylindrical surface and said ceramic blocks.

8. The assembly as recited in claim 2 wherein said blocks are substantially rectangular in plan form with said dovetail surfaces formed on the upstream and downstream edges thereof and a groove formed on each of the remaining two edges, mutually facing grooves of circumferentially adjacent blocks forming a cavity for receiving a seal to inhibit flow leakage between said blocks.

9. The assembly as recited in claim 8 wherein said seal is substantially tubular in shape.

10. A turbine shroud assembly comprising:
 a plurality of ceramic blocks arranged in a ring, each block being of substantially rectangular plan form and having an arcuate inner surface partially defining a hot gas passage and a pair of dovetail surfaces disposed on opposite edges of the block at an angle to the inner surface; and
 support means including at least one ring of flexible fingers for clamping said dovetail surfaces and for producing a preloaded radial force component against said blocks to accommodate thermal expansion differences of said ceramic blocks and said support means, and rigid stop means upon which said blocks are forced by said fingers for establishing their proper radial position in the assembly.

11. A turbine shroud assembly comprising:
 a pair of annular support members, each having a rigid stop and being separated to form an annular space therebetween;
 a plurality of ceramic blocks arranged in a ring within said annular space, each block being of substantially rectangular plan form and having an inner surface partially defining a hot gas passage and a pair of inclined dovetail surfaces disposed on opposite edges of the blocks, said dovetail surfaces bearing against said stops; and
 an annular spring extending from an annular support member and bearing against said blocks for urging said blocks against said stops to establish their proper radial position in the assembly.

12. The assembly as recited in claim 11 wherein said blocks are urged in the radially inwardly direction against said stops.

* * * * *